US011278829B2

(12) United States Patent
Guy et al.

(10) Patent No.: US 11,278,829 B2
(45) Date of Patent: Mar. 22, 2022

(54) FILTERWELL CARTRIDGE HOLDER

(71) Applicant: King Technology Inc., Hopkins, MN (US)

(72) Inventors: David Guy, Maple Grove, MN (US); Jeffrey D Johnson, Edina, MN (US); Paul Freeberg, South St. Paul, MN (US); Terry Goeman, Minnetonka, MN (US); Lyle Enderson, Maple Grove, MN (US); Darrin Swagel, Minnetonka, MN (US); Eric Barton, Eden, MN (US)

(73) Assignee: KING TECHNOLOGY INC

( * ) Notice: Subject to any disclaimer, the term of this patent is extended or adjusted under 35 U.S.C. 154(b) by 81 days.

(21) Appl. No.: 16/873,292

(22) Filed: Mar. 11, 2020

(65) Prior Publication Data

US 2020/0282347 A1   Sep. 10, 2020

Related U.S. Application Data

(63) Continuation-in-part of application No. 16/059,977, filed on Aug. 9, 2018, now Pat. No. 10,988,951.

(60) Provisional application No. 62/919,549, filed on Mar. 15, 2019, provisional application No. 62/564,620, filed on Sep. 28, 2017, provisional application No. 62/544,173, filed on Aug. 11, 2017.

(51) Int. Cl.
*B01D 35/30* (2006.01)
*B01D 27/08* (2006.01)

(52) U.S. Cl.
CPC .......... *B01D 35/306* (2013.01); *B01D 27/08* (2013.01); *B01D 2201/0415* (2013.01); *B01D 2201/40* (2013.01)

(58) Field of Classification Search
CPC .. B01D 35/306; B01D 27/08; B01D 2201/40; B01D 2201/0415; B01D 2201/4023
USPC ......... 210/167.11, 167.12, 167.19, 206, 232; 422/266
See application file for complete search history.

(56) References Cited

U.S. PATENT DOCUMENTS

| 5,350,512 | A   | * | 9/1994  | Tang ..................... B01F 1/00 210/199 |
| 6,685,827 | B2  | * | 2/2004  | King ..................... B01F 1/0027 210/167.11 |
| 7,413,668 | B2  | * | 8/2008  | Reid ..................... B01D 35/301 210/232 |
| 7,763,170 | B2  | * | 7/2010  | Bassett ................ B01D 27/106 210/232 |
| 9,314,747 | B2  | * | 4/2016  | King ..................... C02F 1/688 |
| 11,008,770 | B1 | * | 5/2021  | Brennan ............... E04H 4/1236 |
| 2008/0135501 | A1 | * | 6/2008 | Tadlock ............... B01D 35/303 210/767 |
| 2010/0300952 | A1 | * | 12/2010 | Clausen ............... B01D 35/30 210/236 |
| 2014/0217003 | A1 | * | 8/2014 | Huda .................... B01D 35/303 210/236 |
| 2019/0048604 | A1 | * | 2/2019 | Guy ...................... B01F 1/0027 |

* cited by examiner

*Primary Examiner* — Fred Prince
(74) *Attorney, Agent, or Firm* — Johnson & Phung LLC

(57) ABSTRACT

A filterwell cartridge holder having a face for compressible engaging pleats on a water filter cartridge and a further face holding a dispensing cartridge thereon in a position to release dispersants into a filterwell containing a water filter cartridge.

23 Claims, 5 Drawing Sheets

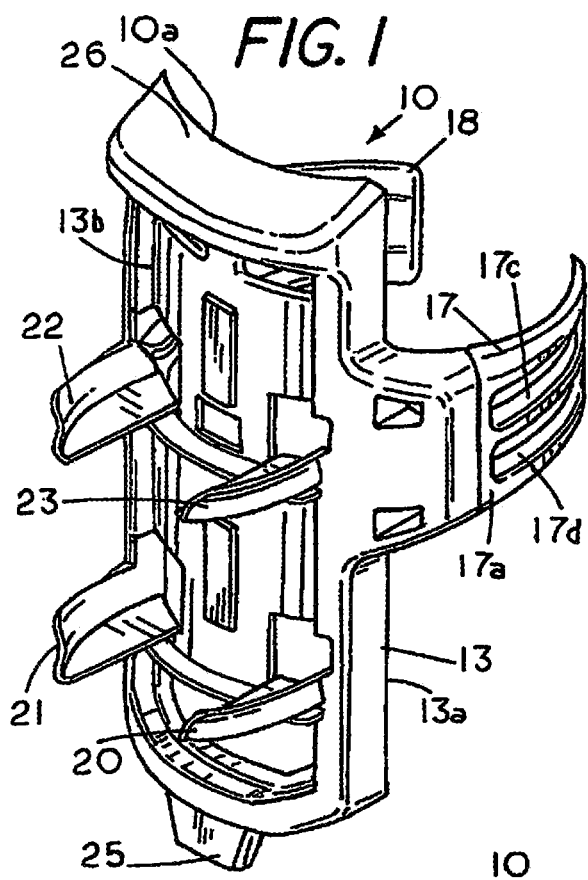
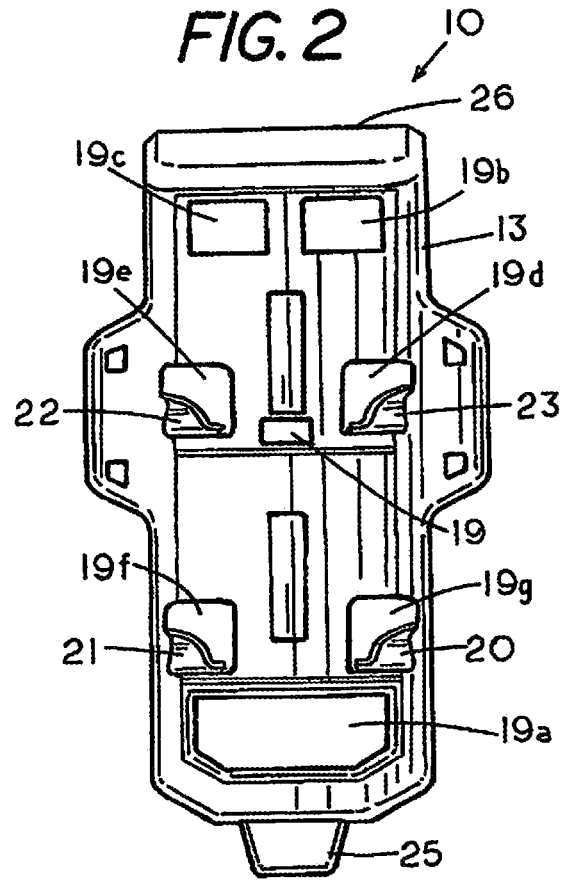
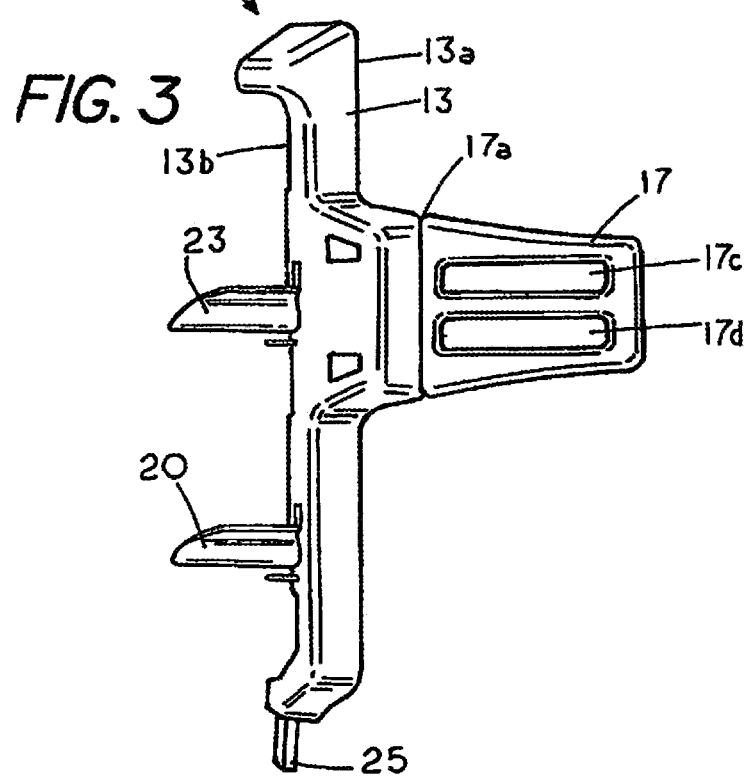

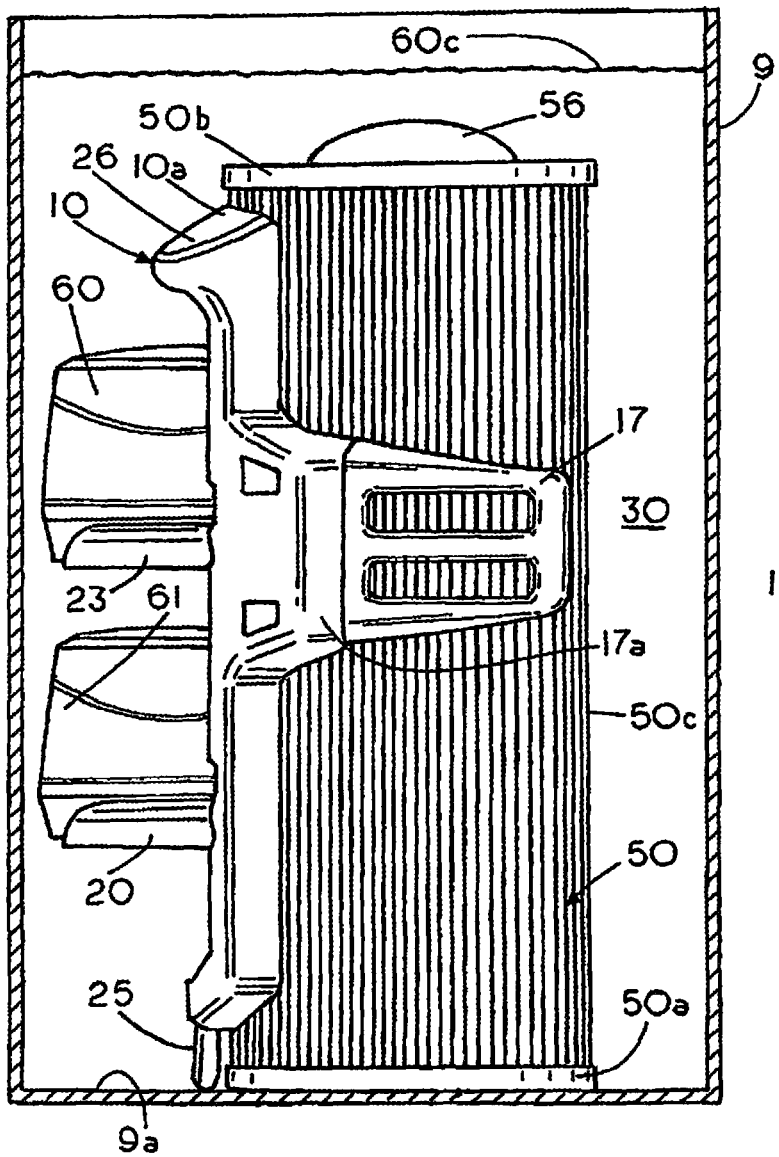
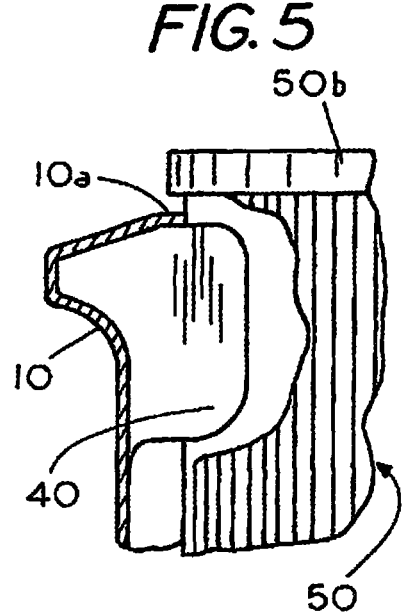
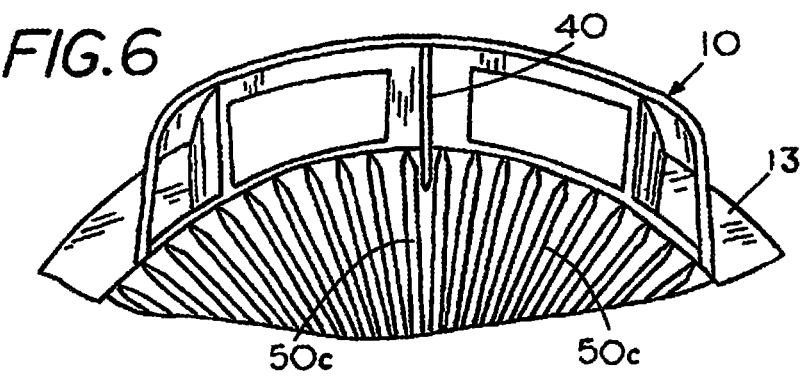

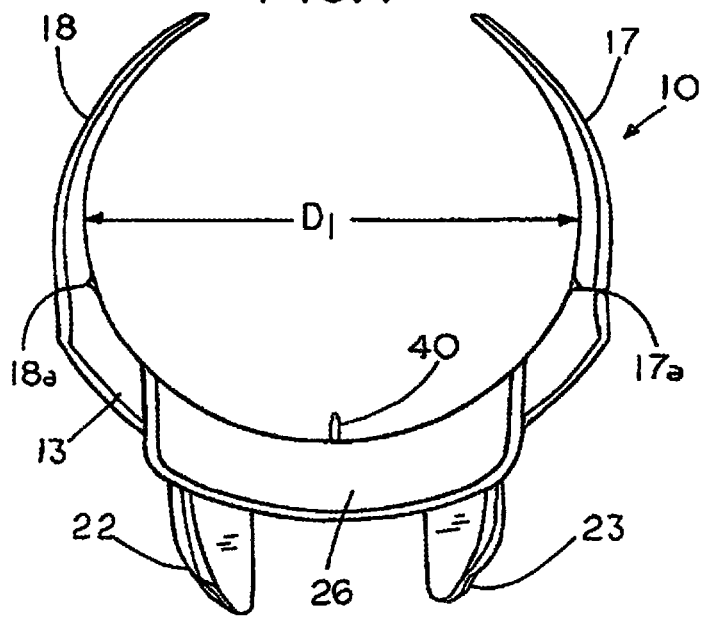
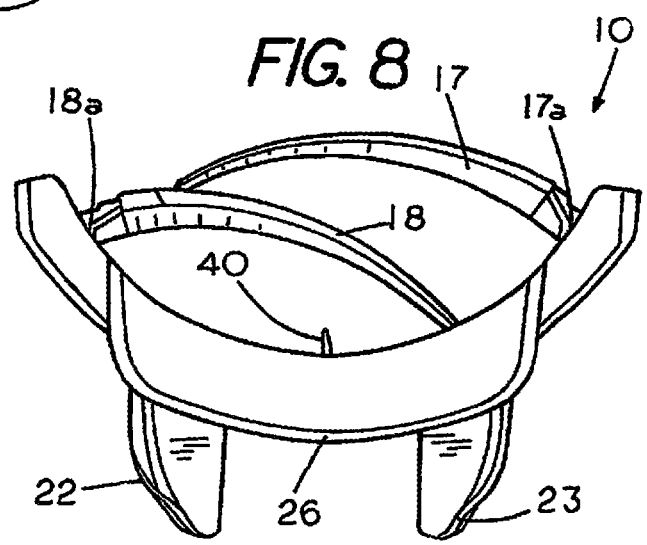
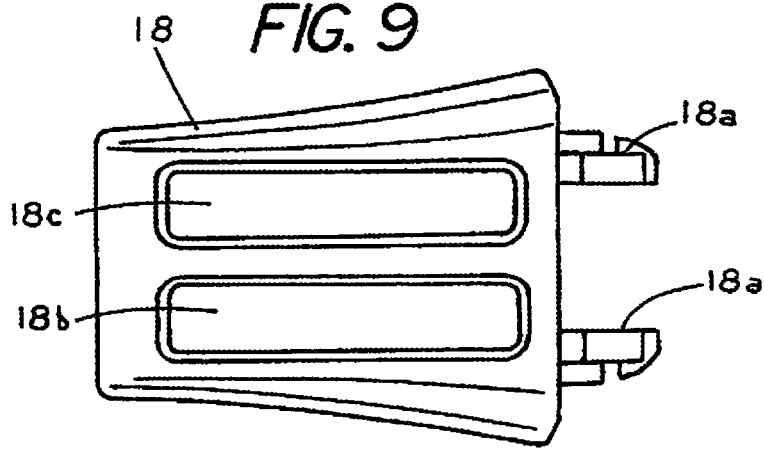

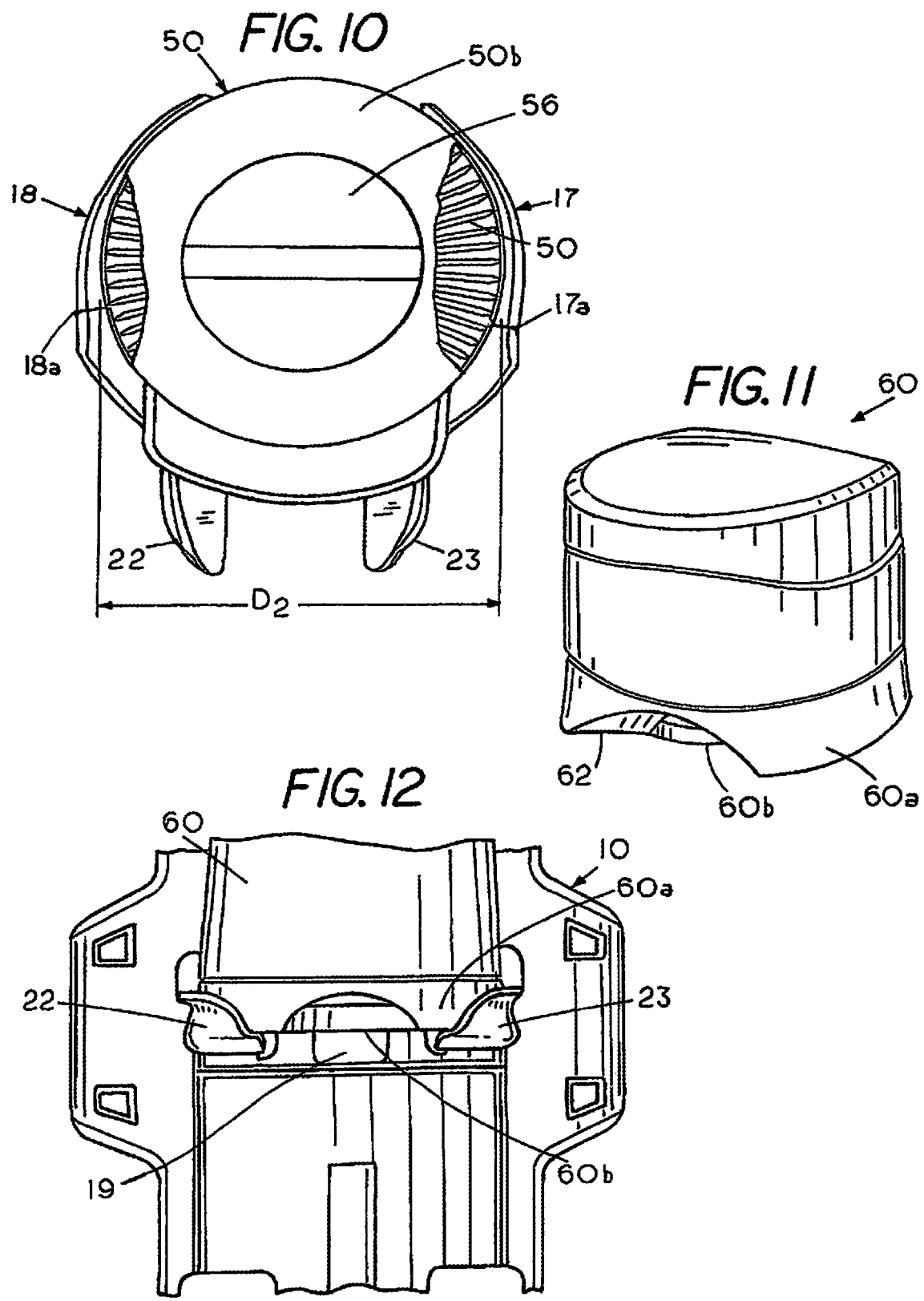

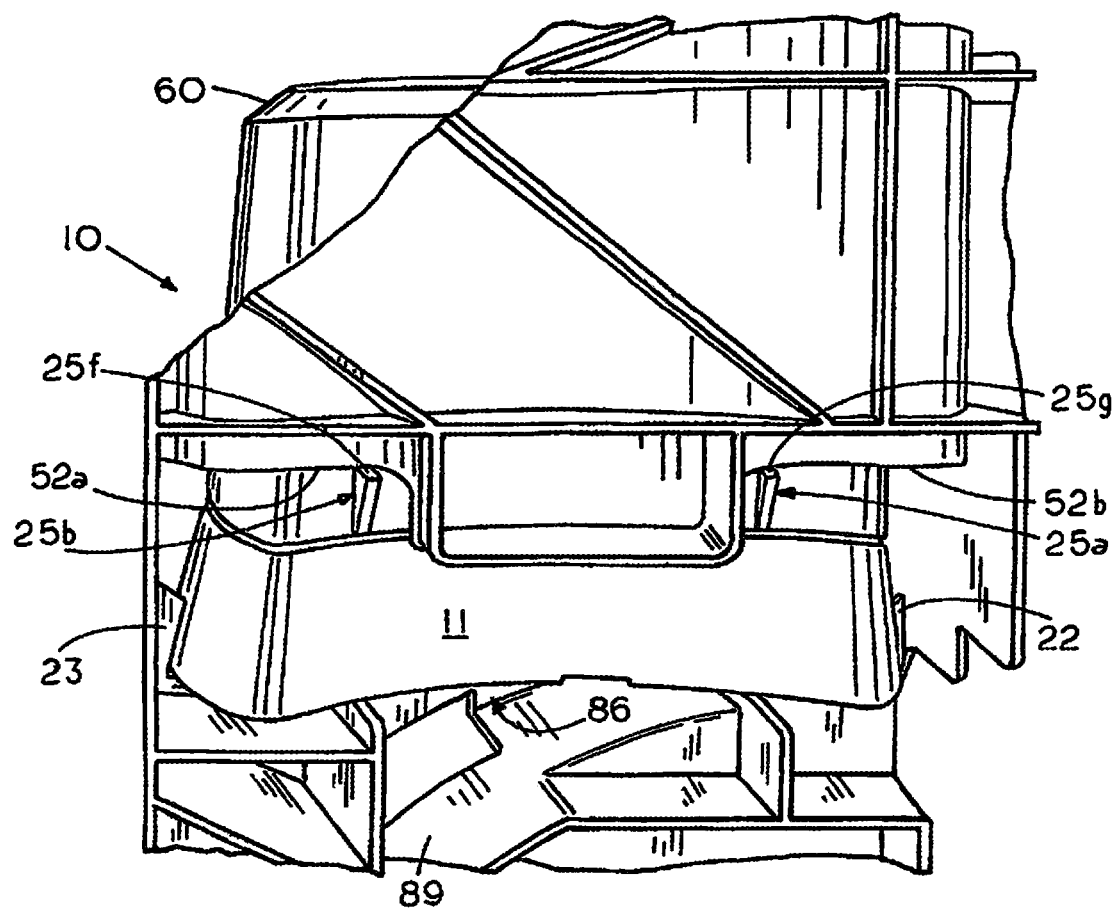

FILTERWELL CARTRIDGE HOLDER

CROSS REFERENCE TO RELATED APPLICATIONS

This application claims priority from provisional application Ser. 62/919,549 filed Mar. 15, 2019 and is a continuation in part of U.S. patent application Ser. No. 16/059,977 filed Aug. 9, 2018, which claims priority from provisional application 62/544,173 filed Aug. 11, 2017 and provisional application 62/544,173 filed Sep. 28, 2017.

STATEMENT REGARDING FEDERALLY SPONSORED RESEARCH OR DEVELOPMENT

None

REFERENCE TO A MICROFICHE APPENDIX

None

BACKGROUND OF THE INVENTION

Dispensing cartridges are known in the art and are used to dispense sanitizing chemicals into bodies of waters such as pools and hot tubs through water contact with the dispersant within the dispensing cartridge. Typically, the dispensing cartridges have a chamber for holding a dispersant and a set of variable openings that permits ingress and egress of water into the chamber to bring the water into contact with the disperant therein. Since water conditions affect how and when the dispersant is released from the dispensing cartridges there are a number of different types of dispensing cartridges that have evolved for delivery of a sanitizing disperant into a body of water. An example of a free floating dispensing cartridge that gradually releases disperant into a body of water as water seeps into the disperant chamber in the dispensing cartridge is shown in U.S. Pat. No. 10,047,535. An example of a dispensing cartridge that is fitted and secured within a dispenser with water flowing through the disperant containing chamber is shown in U.S. Pat. No. 9,314,747. An example of a dispensing cartridge system that dispenses two separate dispersants into the body of water as the dispensing cartridge system floats in a body of water is shown in U.S. Pat. No. 7,060,190. An example of a dispensing cartridge having diffusion ports that can be used in either a stagnate water environment or a moving fluid environment is shown in U.S. Pat. No. 9,714,129. An example of a dispensing cartridge where the release of dispersant is dependent on how far the dispensing cartridge is lowered into a stream of water flowing through a valve is shown in U.S. Pat. No. 4,270,565.

While the prior art reveals multiple types of dispensing cartridges for use in various bodies of water one of the more challenging locations for a dispensing cartridge is in the open top filterwell of a hot tub or spa where water flows from a main tub area, where persons sit, into a separate smaller water compartment containing a filter, with the smaller water compartment referred herein as a filterwell. The water then flows through a cartridge filter in the filterwell to remove debris from the water before returning the water to the main tub area.

While the location of a dispensing cartridge in the filterwell has the advantage of keeping the dispensing cartridge out of the main tub area of the hot tub or spa and into a region where water flows therethrough the filterwell dispensing cartridge needs to be able to reliably deliver dispersant into the water as the water flows through the filterwell without interfering with the filtering action within the filterwell. In addition since the flow of water through the filterwell, which is a small compartment where water flow patterns change as a result of change of the activity level in the hot tub, can cause a free floating filterwell cartridge to be tossed about in the filterwell. Such tossing action can affect the delivery rate of the cartridge as well as cause damage to cartridge filter in the filterwell and to the dispensing cartridge. For example, one should prevent the dispensing cartridge from hitting the walls of the filterwell due to the changing or swirling water flow patterns within the filterwell since either or both the dispensing cartridge or the walls of the filterwell could be damaged. In addition such violent action of the dispensing cartridge can generate unwanted noises and improper dispensing rates. Furthermore since the filterwell dispensing cartridges need to be periodically replaced the filterwell dispensing cartridges should be easily removable and easily replaceable within the filterwell.

While replacement of a dispensing cartridges is important it is also desirable to have dispensing cartridges located in the filterwell in a position where the amount of delivery of the dispersant into the filterwell can be changed on-the-go. Typically, changing the dispensing rate of disperant needs to be convenient as well easily accomplished by a person without any tools as changing the dispensing rate depends on an ongoing bacterial load in the hot tub. Various dispensers have been placed proximate the filterwell including a dispenser mounted on the gate to the filterwell and a dispenser mounted within the core of the cartridge filter in the filterwell as shown in U.S. Pat. No. 6,165,358.

Neither of these devices allows a hot tub user to easily change the rate of dispersant therefrom.

SUMMARY OF THE INVENTION

Briefly, the invention comprises a filterwell dispensing cartridge holder having a panel with a front face for removably supporting a dispensing cartridge thereon and an arcuate back face with a pair of circumferentially extending arcuate arms extending therefrom for compressive securement of the filterwell dispensing cartridge holder to the pleats on a water filter cartridge with the filterwell dispensing cartridge holder supporting the filterwell dispensing cartridge thereon in position that minimizes interferences with the filtering action of the water cartridge filter while the filterwell dispensing cartridge thereon delivers dispersants into the body of water in the filterwell containing the filterwell dispensing cartridge holder.

BRIEF DESCRIPTION OF THE DRAWINGS

FIG. 1 is a perspective view of a filterwell dispensing cartridge holder;

FIG. 2 is a front view of the filterwell dispensing cartridge holder of FIG. 1;

FIG. 3 a side view of the filterwell dispensing cartridge holder of FIG. 1;

FIG. 4 shows the filterwell dispensing cartridge holder of FIG. 1 mounted in a filterwell of a spa;

FIG. 5 is an isolated view of a tab extendable between adjacent pleats on a water cartridge filter;

FIG. 6 is a partial top sectional view showing the tab of FIG. 5 extending between adjacent pleats of a water filter cartridge;

FIG. 7 is top plan view of the filterwell dispensing cartridge holder of FIG. 1;

FIG. 8 is a top plan view of the filterwell dispensing cartridge holder of FIG. 7 with the foldable arms in a collapsed condition;

FIG. 9 is an isolated view of a folding arm of the filterwell dispensing cartridge holder of FIG. 1;

FIG. 10 is a top view partially in section shown the foldable arms in engagement with a water filter cartridge;

FIG. 11 is perspective view of a dispensing cartridge mountable in the filterwell dispensing cartridge holder of FIG. 1;

FIG. 12 is a partial front view of the dispensing cartridge of FIG. 11 mounted on front face of the filter cartridge holder of FIG. 1; and FIG. 13 is a partial rear view of the cartridge holder of FIG. 4 with a dispensing cartridge secured therein.

DESCRIPTION OF THE PREFERRED EMBODIMENT

FIG. 1 is a perspective view of a filterwell dispensing cartridge holder 10 that is compressively engageable with a water filter cartridge while FIG. 4 shows the filterwell dispensing cartridge holder 10 compressively mounted on a vertical extending water filter cartridge 50, which is located in a filterwell 9 of a hot tub or spa.

In this example filterwell dispensing cartridge holder 10 includes an elongated panel 13 having an arcuate face 13a abuttable and mateable with the outer peripheral curvature of water filter cartridge 50. FIG. 4 shows panel 13 mateable along a peripheral length of a cylindrical water filter cartridge 50. A set of arcuate arms 17 and 18 extending outward from elongated panel 13 to hold arcuate face 13a in circumferential and compressive engagement with pleats 50c on cylindrical water filter cartridge 50 with sufficient force so as to maintain cartridge holder 10 proximate water filter cartridge 50 during the flow of water through the filterwell 9 and into the water filter cartridge 50. In this example the arcuate face 13a and arms 17 and 18 have a circular shape as does the pleats 50c of the water filter cartridge 50, however, holder arcuate face 13a and arms 17 and 18 may be formed into a non circular shape for compressively gripping the water filter cartridge 50 without departing from the spirit and scope of the invention.

In this example panel 13 includes a toe 25 that extends from a bottom end of the elongated panel 13 to engage a bottom surface 9a of the filterwell 9 to limit downward displacement of the dispensing cartridge holder. To prevent accidental engagement of toe 25 with water filter cartridge end cap 50a the toe 25 is spaced slightly outward from end panel 13 to create a gap therebetween as shown in FIG. 4. Similarly, a lip 10a extends from a handhold 20, which is located on a top end of elongated panel 13, to engage an underside of a top water filter cartridge rim 50b (FIG. 5) to limit upward displacement of the dispensing cartridge holder 10 with respect to the water filter cartridge 50, which is fixedly mounted in filterwell 9. FIG. 5 and FIG. 6 show a rib 40 that extends from elongated panel 13 that can be used to maintain a fixed rotational relationship of dispensing cartridge holder 10 with respect to the vertical 25 extending cylindrical water filter cartridge 50 through the extension of rib 40 between adjacent pleats 50c on water filter cartridge 50 thereby limiting rotational displacement of water filter cartridge 50 with respect to dispensing cartridge holder 10. Rib 40 also engages the underside of filter cartridge rim 50b as an alternate method to limit upward displacement of the dispensing cartridge holder 10 with respect to the water filter cartridge 50, which is fixedly mounted in filterwell 9. In this example the dispensing cartridge holder 10 hugs the water filter cartridge 50 while the lip 10a and rib 40 either alone or in conjunction with each other limit upward displacement of the panel 13 and toe 25 limits downward displacement of panel 13 to maintain the dispensing cartridge holder 10 in an operating condition shown in FIG. 4. In this example the rib 40 (as shown in FIG. 6) is sufficiently short so that dispensing cartridge holder 10 can be rotated across pleats 50c if sufficient rotational, force is applied to dispensing cartridge holder 10. In other cases it may be desired rib 40 extend sufficiently far between pleats 50c to prevent rotation of dispensing holder from rotating across pleats 50 when a rotational force is applied to dispensing cartridge holder 10.

FIG. 7 shows a top view of filterwell dispensing cartridge holder 10 in an open condition revealing a first arcuate arm 17 extending from one side of face of elongated panel 13 with arcuate arm 17 having a hinge 17a for folding a portion of arcuate arm 17 inward for storage or transporting. Similarly, extending from the opposite side of elongated panel 13 is a second arcuate arm 18 with the arcuate arm 18 having a hinge 18a for folding the second arm inward 18 for transporting or storage as shown in FIG. 8.

To attach dispensing cartridge holder 10 to water filter cartridge 50 one places the first arcuate arm 17 and the second arcuate arm 18 in an open position shown in FIG. 7 before placing the dispensing cartridge holder 10 around water filter cartridge 50. FIG. 10 shows a cutaway top view of water filter cartridge 50. In this example the pleat diametrical dimension $D_2$ of water filter cartridge 50 is greater than the diametrical diameter $D_1$, (FIG. 7) between arcuate arm 17 and arcuate arm 18. Consequently, circumferential engagement of dispensing holder arcuate arm 17 and arcuate arm 18 with the water filter carriage pleats 50c preferably produces a compressive engagement (i.e. an interference fit) therebetween. The compressive engagement or hugging engagement therebetween as shown in FIG. 4 and FIG. 10 is sufficient to support the dispensing cartridge holder 10 in a vertical operating condition proximate the vertical extending water filter cartridge 50. The resiliency of arms 17 and 18 permit radial spreading the arms so that the filterwell dispensing cartridge holder 10 can be axially inserted around the water filter cartridge 50 as shown in FIG. 10. Once the filterwell dispensing cartridge arms 17 and 18 are around the outside of water filter cartridge 50 the arms are released and the resiliency of the arms brings arms 17 and 18 into compressive engagement with the pleats 50c of the water filter cartridge 50 as shown in FIG. 10.

In the example shown the arcuate foldable arms 17 and 18 each have a tapered end that folds inward for storage or transportation, however, if desired the foldable arms could fold outward enabling one to fold the arms outward before laterally inserting the arcuate arms around the larger diameter water filter cartridge. The foldable arms could then be closed to bring the folding arms to a closed or hugging position around the water filter cartridge.

In this example the panel front face 13b includes a first set of upper resilient dispensing cartridge engaging arms 22 and 23 that extend radially outward from panel front face 13b to support a first dispensing cartridge 60 therebetween. (i.e. below a filterwell water line 60c). Similarly, a second set of lower resilient dispensing cartridge engaging arms 21 and 20 extend radially outward from the arcuate panel front face 13b to support a second dispensing cartridge 61 therebetween. As shown in FIG. 4 both the dispensing cartridges 60 and 61 are located below the water line 60c (i.e. an underwater condition) so that the dispersant therein can be dispersed directly into water 30 in filterwell 9.

FIG. 11 and FIG. 12 show a dispensing cartridge 60, which typically has dispensing openings (not shown) in a bottom end face 60b for delivery of dispersants therefrom FIG. 12 shows dispensing cartridge 60 sandwichingly supported on the dispensing cartridge holder 10 through mating engagement between arcuate resilient extension 22 and arcuate resilient extension 23. FIG. 12 shows that each arcuate extension vertically and horizontal engage two adjoining faces of a dispensing cartridge 60 located therein. That is, resilient extension 22 and resilient extension 23 engages diametrical opposite faces on rim 60a, which exposes bottom end 60b having dispensing opening therein in a position to deliver dispersants into the water in the filterwell. In this example the first set of resilient cartridge engaging arms and the second set of resilient cartridge engaging arms each have adjoining faces located at an angle of less than 90 degrees so that the adjoining faces are engageable with mating faces an end of a dispensing cartridge to sandwichingly support a dispensing cartridge thereon.

An example of dispensing cartridge for securement thereon is shown in our copending application titled dispensing cartridge that is filed on even date herewith.

Dispensing cartridge holder 10 includes a water port 19 proximate end 60b of dispensing cartridge 60 with the water port 19 extending through the dispensing cartridge holder 10 to allow water to flow therethrough and past a dispensing end 60b of dispensing cartridge 60. A feature of water port 19 is that the dispensing rate of dispensing cartridge 60 increases as the pump (not shown) draws water through the water filter 50 as the restricted area of the water port 19 increases the velocity of the water past the bottom of the dispensing cartridge 60 which increases the dispensing rate of dispensing cartridge 60.

Dispensing cartridge 60 is shown in a perspective view in FIG. 11 to reveal a circumferential rim 60a that can be sandwichingly engaged with and supported between lateral extension 22 and lateral extension 23 as dispersants are delivered through the bottom end 60b of dispensing cartridge 60. In this example a relief area 62a in dispensing cartridge 60 provides access to a rotatable disk (not shown) that controls the size of the open area therein and consequently the dispensing rate of a dispersant through bottom end 60b of dispensing cartridge 60.

In order to minimize water flow interference through the water filter cartridge 50 the dispensing cartridge holder end panel 13 contains a set of water ports 19a, 19b, 19c, 19d, 19e, 19f and 19g that permit water to flow therethrough and into the pleats 50c of the water filter cartridge 50. Arcuate arm 17 also contains elongated water ports 17c and 17d that permit water to flow therethrough and into the pleats 50c of the water filter cartridge 50. Similarly, FIG. 9 shows the arcuate arm 18 contains identical elongated water ports 18c and 18d that permits water to flow therethrough and into the pleats 50c of the water filter cartridge 50. In this example hinges 18a pivotally connect arcuate arm 18 to one side of panel 13 with the hinges detachable for removal of arm 18 from panel 13.

Similarly, hinges 17a pivotally connect arcuate arm 17 to an opposite side of panel 13 also with the hinges detachable for removal of arm 17 from panel 13.

As described and shown herein the invention includes a filterwell dispensing cartridge holder 10 removably engageable with a water filter cartridge 50 in a filterwell 9 with the filterwell dispensing cartridge holder 10 having a panel 13 with a face 13a abuttable against a set of pleats 50c of the water filter cartridge and a pair of arms 17 and 18 extending from the panel 13 with the pair arms compressively engageable with the water filter cartridge 50 to hug and maintain the filterwell dispensing cartridge holder 10 proximate the water filter cartridge with at least one cartridge holder on panel 13. The filterwell dispenser cartridge holder, which is shown in FIG. 4, supporting a dispensing cartridge 60 in a dispensing position as water flows through the set of pleats 50c of the water filter cartridge 50.

FIG. 13 shows a partial view of the filterwell dispenser cartridge holder 10, which is positionable on an elongated water filter cartridge 50 with a dispensing cartridge 60 having a base 11 supported on resilient dispensing cartridge engaging arms 22 and 23 on filterwell dispenser cartridge holder 10 to enable dispensing of dispersants, such as minerals and a halogen, into a water port 86 through a flow ramp 89, which is located below the bottom end of dispensing cartridge 60, which typically contain a bottom with end ports for ingress and egress of water and dispersants therethrough. The filterwell dispenser cartridge holder 10 includes a first lip 52a and a second lip 52b that coact with dispensing cartridge holder 10 to support the dispensing cartridge thereon. In this embodiment dispensing cartridge 10 includes a rib 25a and a rib 25b that extend outward from a back face of dispensing cartridge 60. Rib 25a has a top surface 25g to abut lip 52b on housing of dispensing cartage holder 10 to assist in maintaining dispensing cartridge 60 in a fixed position in the filterwell dispenser cartridge holder 10. Similarly, rib 25b extends outward from the dispensing cartridge 60 with a top surface 25f abutting a second lip 52a on filterwell dispenser holder 10 to further assist in maintaining dispensing cartridge 60 in a dispensable condition on the filterwell dispenser cartridge holder 10.

We claim:

1. A filterwell dispensing cartridge holder engageable with a vertical extending water filter cartridge with the filterwell dispensing cartridge holder comprising:
   a panel having an arcuate face abuttable against a set of pleats of the vertical extending water filter cartridge with a portion of said panel limiting upward axial displacement of the filterwell dispensing cartridge holder and a further portion of said panel limiting downward displacement of the filterwell dispensing cartridge holder;
   a pair of arms extending from said panel with said pair of arms compressively engageable with the vertically extending water filter cartridge to maintain the filterwell dispensing cartridge holder proximate the water filter cartridge;
   a first dispensing cartridge holder on said panel for supporting a dispensing cartridge in a first dispensing position; and
   a second dispensing cartridge holder for supporting a second dispensing cartridge thereon in a second dispensing condition.

2. The filterwell dispensing cartridge holder of claim 1 including a rib on said panel with said rib positionable in the set of pleats of the water filter cartridge to limit upward axial displacement of the filterwell dispensing cartridge holder.

3. The filterwell dispensing cartridge holder of claim 1 including a first water port in said panel with said first water port located below a dispensing end of the first dispensing cartridge supported thereon and a second water port in said panel with said second water port located below a dispensing end of the second dispensing cartridge supported thereon.

4. The filterwell dispensing cartridge holder of claim 1 wherein each of the pair of arms include hinges thereon for folding each of the pair of arms.

5. The filterwell dispensing cartridge holder of claim 1 including a first set of lateral extensions on a front face of the cartridge holder to support the first dispensing cartridge below a water line in a filterwell and a second set of lateral extensions on the front face of the cartridge holder to support the second dispensing cartridge below the water line in the filterwell.

6. The filterwell dispensing cartridge holder of claim 1 wherein the first cartridge holder and the second cartridge holder cantilever outward from a front face of the panel.

7. The filterwell dispensing cartridge holder of claim 1 wherein each of the arms of the pair of arms include water ports therein to allow water to flow into the water filter cartridge through the water ports.

8. The filterwell dispensing cartridge holder of claim 1 including a handhold for grasping the dispensing cartridge holder when removing the dispensing cartridge holder from engagement with the vertically extending water filter cartridge.

9. The filterwell dispensing cartridge holder of claim 1 where the arcuate face has a first radius of curvature and an outer edge of the pleats on the water filter cartridge have a second radius of curvature with the first radius of curvature and the second radius of curvature substantially equal.

10. The filterwell dispensing cartridge holder of claim 1 wherein each of the pair of arms include a tapered end.

11. The filterwell dispensing cartridge holder of claim 1 wherein the first dispensing cartridge holder includes an arcuate extension having a base and an arcuate flange for engaging a cylindrical dispensing cartridge thereon.

12. A filterwell dispensing cartridge holder engageable with a vertical extending cylindrical water filter cartridge located in a filterwell of a hot tub or spa with the dispensing cartridge holder comprising:
   an elongated panel having an arcuate face mateable along a peripheral length of the vertical extending cylindrical water filter cartridge with the elongated panel having a water filter cartridge facing side and a dispensing cartridge support side;
   a toe extending from a bottom end of the elongated panel to limit downward displacement of the dispensing cartridge holder;
   a lip extending from a top end of the elongated panel to limit upward displacement of said dispensing cartridge holder;
   a rib extending from the arcuate panel for maintaining the orientation of the dispensing cartridge holder with respect to the vertical extending cylindrical water filter cartridge;
   a first arcuate arm extending from a first side of the elongated panel with the first arcuate arm having a hinge for folding a portion of the first arcuate arm inward for transporting or outward for filterwell use;
   a second arcuate arm extending from a further side of the panel with the second arcuate arm having a hinge for folding the second arcuate arm inward for transporting or outward for filterwell use with the first arcuate arm and the second arcuate arm coacting to hold the cartridge dispenser holder proximate the vertical extending water filter cartridge;
   a first set of resilient dispensing cartridge engaging arms extending radially outward from said arcuate panel for supporting a first dispensing cartridge in a below water condition;
   a second set of resilient dispensing cartridge engaging arms extending radially outward from said arcuate panel for supporting a second dispensing cartridge in a below water condition; and
   an arcuate lip located on a top end of the panel to limit upward displacement of the dispensing cartridge holder.

13. The filterwell dispensing cartridge holder of claim 12 wherein the first arcuate arm and the second arcuate arm each include a water port therein.

14. The filterwell dispensing cartridge holder of claim 12 including at least one water port located in said elongated panel to allow water to flow under a dispensing cartridge located in the dispensing cartridge holder and into a set of pleats of the filter cartridge.

15. The filterwell dispensing cartridge holder of claim 12 wherein each of the cartridge engaging arms include water ports therein to allow water to flow through the cartridge engaging arms and into a set of pleats of the water filter cartridge supporting the dispensing cartridge holder.

16. The filterwell dispensing cartridge holder of claim 12 wherein a diametrical dimension formed between the first arcuate arm and the second arcuate arm is sufficiently small so as to form an interference fit with a set of pleats on the water filter cartridge to maintain the dispensing cartridge holder proximate the water filter cartridge.

17. The filterwell dispensing cartridge holder of claim 12 wherein the first arcuate arm and the second arcuate arm each having a surface mateable with a set of pleats on a water filter cartridge.

18. The filterwell dispensing cartridge holder of claim 12 wherein the elongated panel comprises acrylonitrile butadiene styrene (ABS).

19. The filterwell dispensing cartridge holder of claim 12 wherein the arcuate face is a concave arcuate face.

20. The filterwell dispensing cartridge holder of claim 12 wherein the first set of resilient cartridge engaging arms and the second set of resilient cartridge engaging arms each have adjoining faces located at an angle of less than 90 degrees so that the adjoining faces engageable with an end of a dispensing cartridge to support the dispensing cartridge thereon.

21. A filterwell dispensing cartridge holder engageable with a water filter cartridge in a filterwell with the filterwell dispensing cartridge holder comprising:
   a panel having a face abuttable against a set of pleats of the water filter cartridge;
   a pair of arms extending from said panel with said pair of arms compressively engageable with the water filter cartridge to hug and maintain the filterwell dispensing cartridge holder proximate the water filter cartridge; and
   at least one cartridge holder on said panel with said at least one cartridge holder supporting a dispensing cartridge in a dispensing position on the filterwell dispensing cartridge holder as water flows through the water filter cartridge.

22. The filterwell dispensing cartridge holder of claim 21 wherein the water filter cartridge is located in the filterwell of a spa.

23. The filterwell dispensing cartridge holder of claim 21 restrainable within the filterwell through engagement of the dispensing cartridge holder with the water filter cartridge and the filterwell.

* * * * *